M. L. SENDERLING.
AUTOMATIC LUBRICATING HUB.
APPLICATION FILED MAR. 4, 1915.
1,174,767.
Patented Mar. 7, 1916.
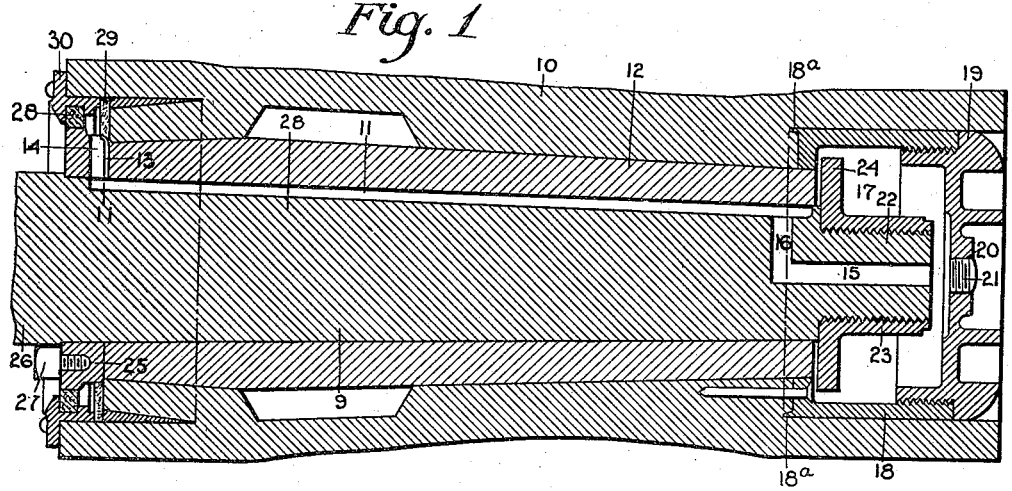
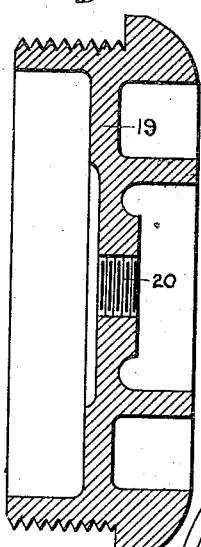
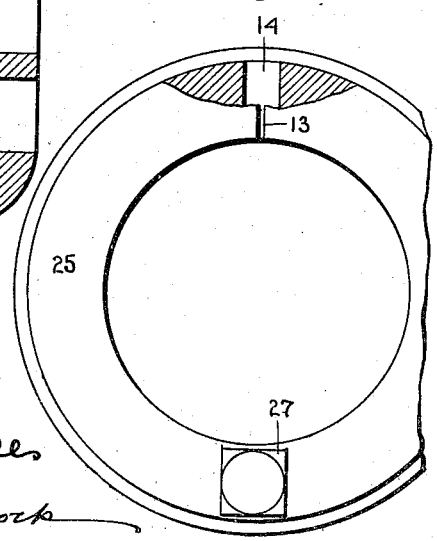
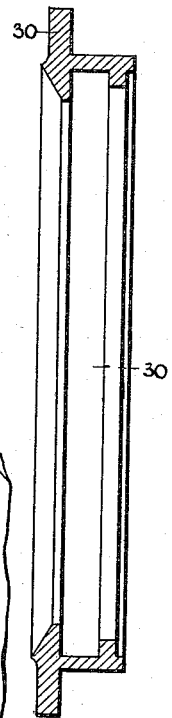
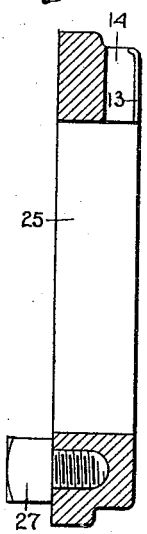
WITNESSES
INVENTOR
Martin L. Senderling
BY
ATTORNEYS

UNITED STATES PATENT OFFICE.

MARTIN L. SENDERLING, OF JERSEY CITY, NEW JERSEY.

AUTOMATIC LUBRICATING-HUB.

1,174,767.   Specification of Letters Patent.   Patented Mar. 7, 1916.

Application filed March 4, 1915.   Serial No. 12,226.

*To all whom it may concern:*

Be it known that I, MARTIN L. SENDERLING, a citizen of the United States, and a resident of Jersey City, in the county of Hudson and State of New Jersey, have invented a new and Improved Automatic Lubricating-Hub, of which the following is a full, clear, and exact description.

Among the principal objects which the present invention has in view are: to provide a simplified device for re-distributing the lubricant to the supply thereof with which the wheel is furnished; to provide means for retaining the lubricant with which the axle is provided, within the hub of a wheel; and to provide a simplified means for holding in place the dust-guard provided in wheels of the character mentioned.

*Drawings.*—Figure 1 is a longitudinal section of a fragment of a hub and an axle journal mounted therein, both constructed, arranged and equipped in conformity with the present invention; Fig. 2 is a vertical section on an enlarged scale, of a cap nut with which the present invention is provided; Fig. 3 is a vertical section, on an enlarged scale, of the ring cap with which the wheel is provided; Fig. 4 is a vertical section, on an enlarged scale, of the thrust ring with which the axle is provided; Fig. 5 is a face view of the same, partly cut away to show the collecting groove formed therein.

*Description.*—As seen in the drawings, the axle journal 9 is of a stationary type, about which a wheel having a hub 10 rotates. The journal is furnished with an upwardly opening groove 11 which is disposed lengthwise of the journal, as shown best in Fig. 1 of the drawings. The groove 11 extends to near the outward extremity of the journal 9, terminating near the extreme outer end of a box 12. The inner end of the groove 11 extends beyond the terminus of said box. At this end the groove 11 registers with the outlet of a vertically-disposed collecting groove 14, which, as hereinafter described, is formed in the thrust collar with which the axle is provided. At the forward end the groove 11 is operatively connected with a central bore 15 by means of a radial branch bore 16. The bores 15 and 16 are provided to return the lubricant to the chamber 17 in the outer end of the hub 10.

The chamber 17 is formed by a sleeve 18 and a cap nut 19. The nut 19 is centrally bored and tapped to hold a screw plug 20. The plug 20 may be of any suitable type, or may have a valve-like automatic closure device, such as shown in the drawings and indicated by the numeral 21. When equipped with the device 21 the plug 20 is not removed to charge the chamber 17, the device receding from its seat to permit the inflow of material to said chamber, and closing to prevent the expulsion of the material therefrom.

The journal 9, as in usual constructions, is reduced to form a nib 22. The nib 22 is furnished with a screw-thread to hold a nut 23, the flange 24 of which is extended to bear against the ends of the box 12 and thereby retain the hub 10 and wheel connected therewith in service position on the journal 9. The sleeve 18 is held in the hub 10 by any suitable and efficient means.

The flange 24 of the nut 23 forms a thrust bearing for the box 12 at the outer extreme of the journal 9. A similar office is performed by a thrust collar 25 which is fitted rigidly on the journal 9 at the inner end thereof. The collar rests against and is held in position by the bed 26 of the axle. The slight space which is provided between the flange 24, the collar 25 and the box 12, is normally supplied with lubricant, being supplied from the chamber 17 in the conventional manner.

The journal 9 is usually tapered. In the operation of a wheel on a tapered journal, the lubricant which is held between the surfaces of the box and journal is carried, partly by capillary action and partly by centrifugal force, to the inner end of the journal 9, that having the larger diameter, and traveling at a greater speed than the surface of the box at the smaller end. The tendency of these operations is to gradually conduct the lubricant toward the thrust bearing at the inner end of the hub and journal, tending thereby to over-supply the lubricant thereto. As a rule, the surplusage seeks an outlet which besmears or otherwise soils the inner face of the hub or the parts of the vehicle on which the wheel is mounted. It is to prevent this and to return the lubricant to the chamber 17 that I provide the vertical groove 14 and the collecting slot 13 in the collar 25, the grooves 11 and bores 15 and 16.

The thrust collar 25 is held in operative position by a bolt 27 which bears against the square side of the bed 26 to prevent the rotation of said collar by reason of the drag thereon of a dust-ring 28 and a packing-ring 29. The ring 28 is held in operative position by a ring cap 30 of suitable construction. This cap is structurally secured to the hub 10, as seen best in Fig. 1 of the drawings. The inner edge of said ring cap engages, to hold in operative position, the ring 29. The inner edge of the ring 29 rests upon the collar 25 at the inner end thereof.

*Operation.*—With a hub thus constructed, heavy lubricant is primarily packed in the chamber 17. After the said chamber is thus packed the cap nut 19 is screwed into position. Subsequently, and from time to time, grease is supplied to the chamber 17. When, now, the wheel having the hub 10 and box 12 rotates, the lubricant passing behind the flange 24, enters between the bearing surfaces of the journal 9 and the box 12 and gradually travels toward the larger end of said journal and the thrust collar 25 there located. The lubricant thus delivered passes between the inner end of the box 12 and the collar 25. As the box 12 rotates each portion of the surface of the inner end thereof passes the slot 13. The surplus deposit of lubricant deposited between said collar 25 and box 12 is forced into or arrested by the slot 13 and groove 14. The groove 14 thus becomes gradually charged. The friction incident to the operation of the wheel sufficiently warms the lubricant in the groove 14 to cause the same to flow. The flowing lubricant passes from the groove 14 into the groove 11 which being slightly inclined returns the lubricant to the box 17. The collecting of the lubricant in the groove 14 is facilitated by the ring 29 which bridges over the gap which might otherwise occur at the upper end of said groove.

The sleeve 18 at the inner end has a vertical flange which closely fits the end of the box 12 and closes the admission between said box and the hub 10, of any grease which might otherwise enter. To more tightly close the wood of the hub 10 upon the box 12 the inner edge of the sleeve 18 is provided with a tapered annular flange 18ª. The taper of said flange is inward so that when the sleeve 18 is forced into position the wood of the hub 10 is crowded toward and more firmly seated upon the box 12.

Claims:

1. The combination of an axle journal having a lubricant return groove; and a thrust collar embodying an open-sided collecting groove in open communication with said return groove.

2. The combination of an axle journal having a lubricant return groove disposed lengthwise thereof; a bearing box rotatively mounted on said journal; and a thrust collar having a bearing surface engaging said box and embodying an open-sided collecting groove radially disposed in open communication with said return groove, said collecting groove being partially closed to form a narrow slot opening thereto.

3. The combination of an axle journal having a lubricant return groove disposed lengthwise thereof; a bearing box rotatively mounted on said journal; a thrust collar engaging said box and embodying an open-sided collecting groove radially disposed and in open communication with said return groove; and a packing ring surrounding said collar for obstructing the passage between said collar and box.

4. The combination of an axle journal having a return groove disposed lengthwise thereof; a bearing box rotatively mounted on said journal; a thrust collar engaging said box and embodying an open-sided collecting groove radially disposed and in open communication with said return groove; a packing ring surrounding said collar for obstructing the passage between said collar and box; and a ring cap for holding said packing ring in operative relation to said box and said collar.

5. The combination of an axle journal having a return groove disposed lengthwise thereof; a bearing box rotatively mounted on said journal; a thrust collar engaging said box and embodying an open-sided collecting groove radially disposed and in open communication with said return groove; a packing ring for said hub surrounding said collar for obstructing the passage between said collar and box; a ring cap for holding said packing ring rigidly in operative position; and a dust-ring mounted in said ring cap to close the space between said collar and said ring cap.

In testimony whereof I have signed my name to this specification in the presence of two subscribing witnesses.

MARTIN L. SENDERLING.

Witnesses:
E. F. MURDOCK,
PHILIP D. ROLLHAUS.